(12) United States Patent
Zhang et al.

(10) Patent No.: US 12,530,356 B2
(45) Date of Patent: Jan. 20, 2026

(54) METHOD AND SYSTEM FOR PROVIDING A CONTEXT-SENSITIVE, NON-INTRUSIVE DATA PROCESSING OPTIMIZATION FRAMEWORK

(71) Applicant: HUAWEI TECHNOLOGIES CO., LTD., Shenzhen (CN)

(72) Inventors: Zanqing Zhang, Toronto (CA); Benoit Hudzia, Dublin (IE); Arven Ding, Toronto (CA); Guo Yang, Shenzhen (CN); Zheng Li, Shenzhen (CN); Jingfang Zhang, Shenzhen (CN); Songling Liu, Shenzhen (CN); Denghong Liao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/882,782

(22) Filed: Aug. 8, 2022

(65) Prior Publication Data
US 2023/0004563 A1    Jan. 5, 2023

Related U.S. Application Data

(63) Continuation of application No. PCT/CN2021/103461, filed on Jun. 30, 2021.

(51) Int. Cl.
*G06F 16/24* (2019.01)
*G06F 8/41* (2018.01)
*G06F 16/2453* (2019.01)

(52) U.S. Cl.
CPC ...... *G06F 16/24549* (2019.01); *G06F 8/4442* (2013.01); *G06F 16/24537* (2019.01); *G06F 16/24542* (2019.01)

(58) Field of Classification Search
CPC .................................................. G06F 16/24549
See application file for complete search history.

(56) References Cited

U.S. PATENT DOCUMENTS 6,567,802 B1    5/2003  Popa et al.
6,745,384 B1    6/2004  Biggerstaff
(Continued)

FOREIGN PATENT DOCUMENTS

CN    102323772 A    1/2012
CN    103729392 A    4/2014
(Continued)

OTHER PUBLICATIONS

Chinese Intellectual Property Office (ISR/CN), "International Search Report for PCT/CN2021/103461", China, Mar. 28, 2022.
(Continued)

*Primary Examiner* — Mohammad S Rostami
(74) *Attorney, Agent, or Firm* — Troutman Pepper Locke LLP; Tim Tingkang Xia, Esq.

(57) ABSTRACT

A method of performing a data search in a data source by which an operator of a data search pipeline is just-in-time optimized and compiled, using an operator optimization module which optimizes and compiles an intermediate representation of the operator, considering runtime information, and optimization rules, to produce an operator that is optimized for the data search being performed. The method can be applied with one operator or with many operators applied in any sequence or tree structure according to a query plan, as determined by runtime information and optimization rules.

26 Claims, 9 Drawing Sheets

(56) References Cited

U.S. PATENT DOCUMENTS

| | | | |
|---|---|---|---|
| 7,716,215 | B2 | 5/2010 | Lohman et al. |
| 8,204,875 | B2 | 6/2012 | Srinivasan et al. |
| 9,607,017 | B2 | 3/2017 | Debray et al. |
| 9,934,051 | B1* | 4/2018 | Ding ................... G06F 9/4552 |
| 10,607,134 | B1* | 3/2020 | Cosic ................... G06N 3/084 |
| 10,901,990 | B1 | 1/2021 | Vogelsgesang et al. |
| 11,221,834 | B2* | 1/2022 | Gao ................... G06F 11/3065 |
| 2004/0267719 | A1 | 12/2004 | Doherty et al. |
| 2007/0198484 | A1 | 8/2007 | Ahmed et al. |
| 2008/0016507 | A1* | 1/2008 | Thomas ............... G06F 9/4812 |
| | | | 712/E9.082 |
| 2008/0163181 | A1* | 7/2008 | Guo ................... G06F 8/4442 |
| | | | 717/149 |
| 2008/0229028 | A1* | 9/2008 | Cascaval ............... G06F 8/4442 |
| | | | 711/141 |
| 2009/0216709 | A1 | 8/2009 | Cheng et al. |
| 2010/0070730 | A1* | 3/2010 | Pop ................... G06F 8/4442 |
| | | | 711/E12.001 |
| 2010/0313079 | A1* | 12/2010 | Beretta ............... G06F 9/44521 |
| | | | 717/148 |
| 2012/0005190 | A1* | 1/2012 | Faerber ............. G06F 16/24542 |
| | | | 707/718 |
| 2013/0031536 | A1* | 1/2013 | De ........................... G06F 8/427 |
| | | | 717/146 |
| 2013/0086566 | A1* | 4/2013 | Gaster ................ G06F 9/45525 |
| | | | 712/7 |
| 2013/0205286 | A1* | 8/2013 | Barraclough ....... G06F 9/45516 |
| | | | 717/151 |
| 2014/0245271 | A1* | 8/2014 | Miller ................... G06F 8/423 |
| | | | 717/146 |
| 2014/0365533 | A1* | 12/2014 | Debray ............... G06F 16/2228 |
| | | | 707/803 |
| 2015/0363466 | A1 | 12/2015 | Balmin et al. |
| 2016/0306847 | A1* | 10/2016 | Ding ........................ G06F 8/443 |
| 2017/0083837 | A1* | 3/2017 | Berlandier ........ G06F 16/24564 |
| 2017/0091269 | A1* | 3/2017 | Zhu ..................... G06F 16/258 |
| 2017/0104627 | A1 | 4/2017 | Bender et al. |
| 2018/0089268 | A1 | 3/2018 | Lee et al. |
| 2018/0373515 | A1* | 12/2018 | Brown .................. G06F 8/4434 |
| 2019/0026088 | A1* | 1/2019 | Gong .................... G06F 8/4442 |
| 2019/0121893 | A1* | 4/2019 | Fender .................. G06F 8/4441 |
| 2019/0377589 | A1* | 12/2019 | Hossbach ............... G06F 16/38 |
| 2020/0117433 | A1* | 4/2020 | Tene ......................... G06F 8/75 |
| 2020/0293299 | A1* | 9/2020 | Santosuosso ............. G06F 8/41 |
| 2020/0311084 | A1 | 10/2020 | Merker |
| 2020/0341741 | A1* | 10/2020 | Brooker ............. G06F 11/3624 |
| 2021/0064353 | A1* | 3/2021 | Al Sheikh ............ G06F 9/3846 |
| 2021/0132922 | A1* | 5/2021 | Chen ..................... G06F 8/4442 |
| 2022/0334851 | A1* | 10/2022 | Zhurba ............... G06F 9/44568 |
| 2022/0366008 | A1* | 11/2022 | Shin ........................ G06F 9/544 |

FOREIGN PATENT DOCUMENTS

| | | |
|---|---|---|
| CN | 107250983 A | 10/2017 |
| CN | 108027838 A | 5/2018 |
| CN | 112364053 A | 2/2021 |
| CN | 112749143 A | 5/2021 |
| KR | 20180104498 A | 9/2018 |

OTHER PUBLICATIONS

PCT International Search Report in Respect of International Application PCT/CN2021/103461, Mar. 28, 2022.

Yannis Klonatos, et al., "Building Efficient Query Engines in a High-Level Language", Proceedings of the VLDB Endowment, vol. 7, No. 10, Jun. 1, 2014 (Jun. 1, 2014), pp. 853-864, XP055279415, total 12 pages.

Supplementary European Search Report in respect of European Application No. EP 21 947 521.7 dated May 8, 2024.

European Search Opinion in respect of European Application No. EP 21 947 521.7 dated May 8, 2024.

DU Wu et al., "Similarity query based on Apache AsterixDB", computer knowledge and technology, Feb. 15, 2020,with English abstract total 3 pages.

CN 202411171686.0 Office Action, Jul. 23, 2025.

* cited by examiner

METHOD AND SYSTEM FOR PROVIDING A CONTEXT-SENSITIVE, NON-INTRUSIVE DATA PROCESSING OPTIMIZATION FRAMEWORK

CROSS-REFERENCE TO RELATED APPLICATIONS

This application is a continuation of Patent Cooperation Treaty Application No. PCT/CN2021/103461 filed on Jun. 30, 2021, the content of which is hereby incorporated by reference in its entirety.

TECHNICAL FIELD

This invention pertains generally to the field of retrieving and processing information from a data source and in particular, to methods of retrieving information by using operators that are optimized and compiled based on the executed data search.

BACKGROUND

As massive amounts of data become increasingly available, there is an increasing need for optimizing and speeding up data searches and access. Modern database systems can achieve efficient query processing by using cache-efficient algorithms and data structures, but to further improve query processing, by for example preventing as much as possible branch mispredictions and cache misses, database operators need to be highly tuned for CPU efficiency, which can be achieved by translating database queries to optimized machine code.

To cope with a data source organized as a number of columns of different types, any of which might have to be processed at runtime, the data processing pipeline of a modem database system has to rely on generic logic. In order to manage the spectrum of datasets to be processed, this can often result in a number of for-loops, nested with branches.

Typically, in order to maximize the performance of a search execution and to leverage the target machine optimization, a compiler pass can be applied to optimize a code base. With data processing logic typically written either in a programming language or SQL (structured query language), the compiler pass essentially acts as an interpreter of the code base.

Existing approaches generate code based on a submitted data processing logic (i.e. SQL statements), but once the data processing logic is submitted, most of the variable aspect of the processing flow such as the data types, number of columns, and statistics, are fixed. Because the code used prior to optimization is generic, this can result in a high number of dead portions of code. There is a trade-off as the database architects must provide generic coding for flexibility, but they cannot develop highly specific code due to time and resource constraint.

There is a need for methods and systems that can obviate or mitigate one or more limitations of the existing technique, by having operators in a data search pipeline optimized for each data search.

This background information is provided to reveal information to be of possible relevance to the present disclosure. No admission is necessarily intended, nor should be construed, that any of the preceding information constitutes prior art against the present disclosure.

SUMMARY

In some examples of the present disclosure, operators of a data search pipeline can be prepared by developers and be compiled into intermediate representation (IR) code, before a data search is called for. Upon execution of a data search, parameters of the data query, and of the data query processing engine, along with optimization rules, can be used to optimize the IR coded operators for the data query being performed, and compile them for the query processing engine hardware being used. Furthermore, to facilitate optimization, functions of the operator file that is to be optimized can be annotated or tagged.

In embodiments, a data search includes runtime optimization and compilation of the pipeline operators, and it can be performed in less time than a data search would take with operators that are not optimized and compiled at runtime. In other words, because runtime optimization and compilation workflows according to embodiments can be performed quickly enough, a data search making use of such runtime optimization and compilation, and making use of the resulting optimized operators, can take less time than a data search would take, if it were performed with pre-compiled operators that are not optimized and compiled for the data search.

In embodiments, an operator can be configured with a high level programming language, and be compiled into an intermediate representation (IR) version. Annotations can be used to tag functions which are to be specialized when the operator will be optimized and compiled for the data search at runtime. Optimization of an operator can make use of runtime information and optimization rules. When a data search is executed, an operator required by the data search can be optimized, compiled, and then executed to complete the data search.

A system to perform a data search according to an embodiment should be able to compile an IR coded operator using runtime information of the query processing engine performing the data search. The system and the query processing engine can be separate entities or be combined into one entity with common components.

Examples of the present disclosure include a method of performing a data search, and the method obtains at least one operator, runtime information of the data search, optimization rules, and obtains at least one optimized and compiled operator by optimizing and compiling the at least one operator according to the runtime information of the data search and the optimization rules. Then the method performs the data search using the at least one optimized and compiled operator.

In the above example, an operator can be configured in a high level programming language, and compiled by a front-end compiler into an intermediate representation code of the at least one operator.

In any of the above examples, an operator can include annotations tagging functions which are to be specialized when the at least one operator is being optimized and compiled for the data search at runtime.

In any of the above examples, the runtime information can include includes data layout.

In any of the above examples, the runtime information can include data statistics.

In any of the above examples, the runtime information can include hardware information of the query processing engine.

In any of the above examples, the optimization rules can include global algorithms.

In any of the above examples, the optimization rules can be based on the runtime information.

In any of the above examples the optimization rules can include algorithms specific to the at least one operator.

In any of the above examples, optimizing an operator can include an application of at least one optimization to the code of an operator that increases the efficiency of a data search executing that operator.

In any of the above examples, optimizing an operator can be performed after a data search is called for, and before the data search is complete, such that performing the data search includes executing at least one optimized operator.

In any of the above examples, performing a data search can include optimizing and compiling many operators, which can subsequently be executed by the data search according to a query plan defined by the optimization and compilation.

Some examples of the present disclosure include a system for performing a data search. The system comprises at least one processor, at least one storage medium for data, a query processing engine, a compiler, and at least one operator file configured with a programming language; wherein upon executing the query processing engine, the compiler is operative to obtain at least one optimized and compiled operator file by optimizing and compiling the at least one operator file according to the runtime information of the data search, and according to optimization rules; and wherein performing the data search includes executing the at least one optimized and compiled operator file.

In the above example, prior to being optimized and executed by the query processing engine, the at least one operator file can be configured with a high level programming language and be compiled into intermediate representation code.

In any of the above examples, a system can further include an operator specialization module that is operative to receive at least one operator file, as well as the runtime information from the query processing engine; and to have at least one operator file optimized and compiled based on runtime information.

In any of the above examples, an operator file can be configured with a high level programming language and be compiled into an intermediate representation code.

In any of the above examples, an operator file can include annotations tagging functions that are to be specialized when the operator coded, within the operator file is being optimized and compiled for the data search at runtime.

In any of the above examples, the runtime information can include data layout.

In any of the above examples, the runtime information can include data statistics.

In any of the above examples, the runtime information can include hardware information.

A computer program can include instructions which can, when the program is executed by a computer, cause the computer to carry out the above-mentioned methods.

A computer-readable medium can include instructions which can, when executed by a computer, cause the computer to carry out the above-mentioned methods.

BRIEF DESCRIPTION OF THE DRAWINGS

Throughout the appended drawings, like features are identified by like reference numerals.

DETAILED DESCRIPTION

Modern analytics applications, such as data search and data processing software, can combine multiple functions from different libraries and frameworks to build increasingly complex workflows. In the case of a data search application, functions can be organized as "operators", which can be organized in a sequence, tree or more generally a query plan. Even though each function or operator may achieve high performance in isolation, the performance of the combined workflow is often an order of magnitude below hardware limits. Basically, this is due to a lack of hardware-specific support, lack of specialized operators for data operations, and the high cost of data transfer. To address the above-mentioned problem, embodiments include a framework for data-intensive applications, which can provide multi-level, just-in-time acceleration, optimization and compilation so as to support dynamic user defined functionality.

An embodiment can be adaptive, flexible, and extensible. Moreover, it can be integrated incrementally into an existing framework, such as openLooKeng, Apache Spark, and others, without requiring the front-end application programming interface (API) of the existing framework to be modified. Embodiments have the capability to enable just-in-time code compilation, using runtime information, as well as out-of-band information.

For a data search to retrieve data more efficiently, code generation with query specific information can be used. For example, code generation can allow a user to remove conditionals, to propagate constant offsets, pointers, etc., and to use inline virtual functions calls.

Figure 1:
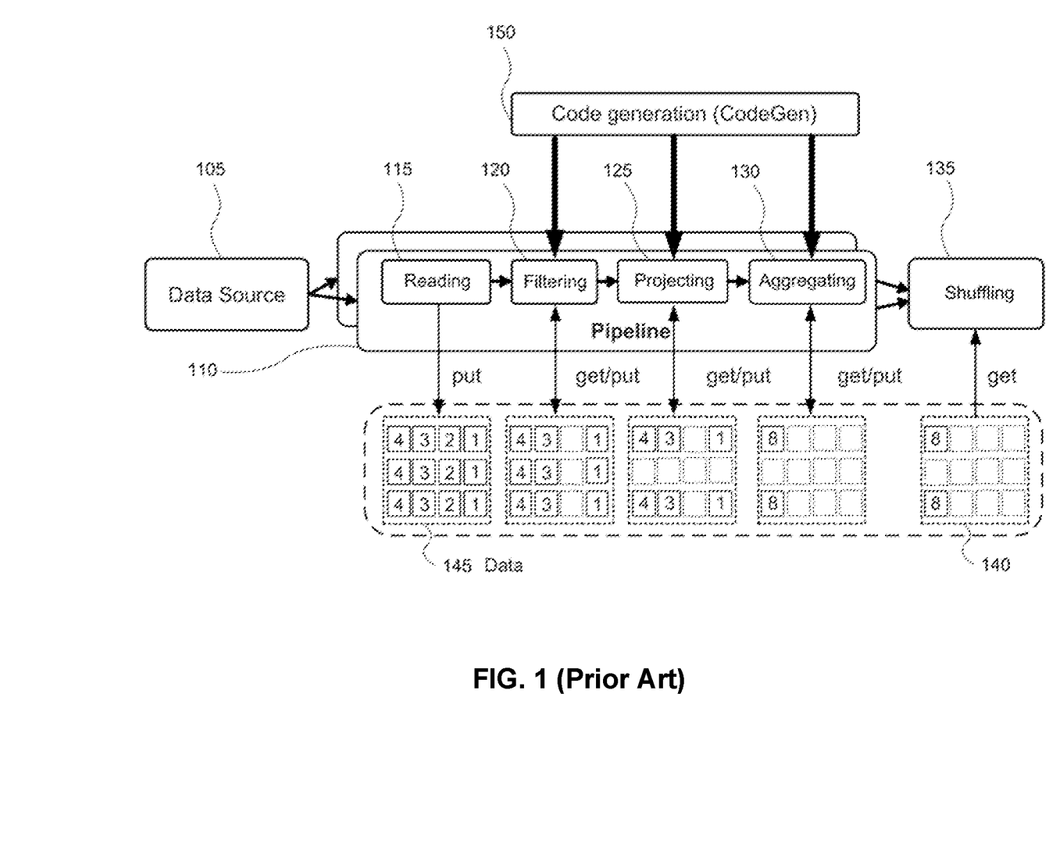
FIG. 1 is a block diagram illustrating a data search processing pipeline, according to prior art.

FIG. 1 illustrates a data search processing pipeline, according to existing solutions. For a given data source 105, a data search can activate a pipeline 110 of operations, each of which processes the data into a new form, until the requested data is produced. For example, a first operation can be reading 115 the data, a second operation can be filtering 120, a third operation can be projecting 125, a fourth operation can be aggregating 130, and a final operation can be shuffling 135. Each operation can be seen as a step towards presenting the requested data 140 from an original set of data 145 of the data source 105. In some cases, code generation 150 can allow a user to remove conditionals, to propagate constant offsets, pointers, etc., and to use inline virtual functions calls.

One approach is to allow code generation that leverages a specific data processing job. This can require much fewer branches, less instructions, and allow faster execution. However, for such specific code generation, the leveraging of expert domain knowledge often turns out to be complex, error-prone, and extremely difficult to debug. Thereafter, it could become very difficult in practice to maintain and extend such query compilers over time, because the complexity of a query compiler's codebase can increase to unmanageable levels as more and more optimizations are added.

Embodiments include an architecture framework making query optimizers and compilers easier to build and to extend, ultimately allowing a programmer to create more sustainable compiler-based data management systems, and to dynamically define and tailor the processing of big data. This framework can improve data retrieval performance and hardware utilization, which wouldn't be possible with existing solutions.

Embodiments include a modular query compiler that can be described using several abstraction levels. Each abstraction level can be responsible for expressing a subset of optimizations. This allows a separation of concerns between the different kinds of code optimizations. Further, through multiple levels of abstraction, an embodiment can allow a high-level query to progressively turn into low-level code, allowing for a more controlled approach to code generation.

Figures 2A, 2B:
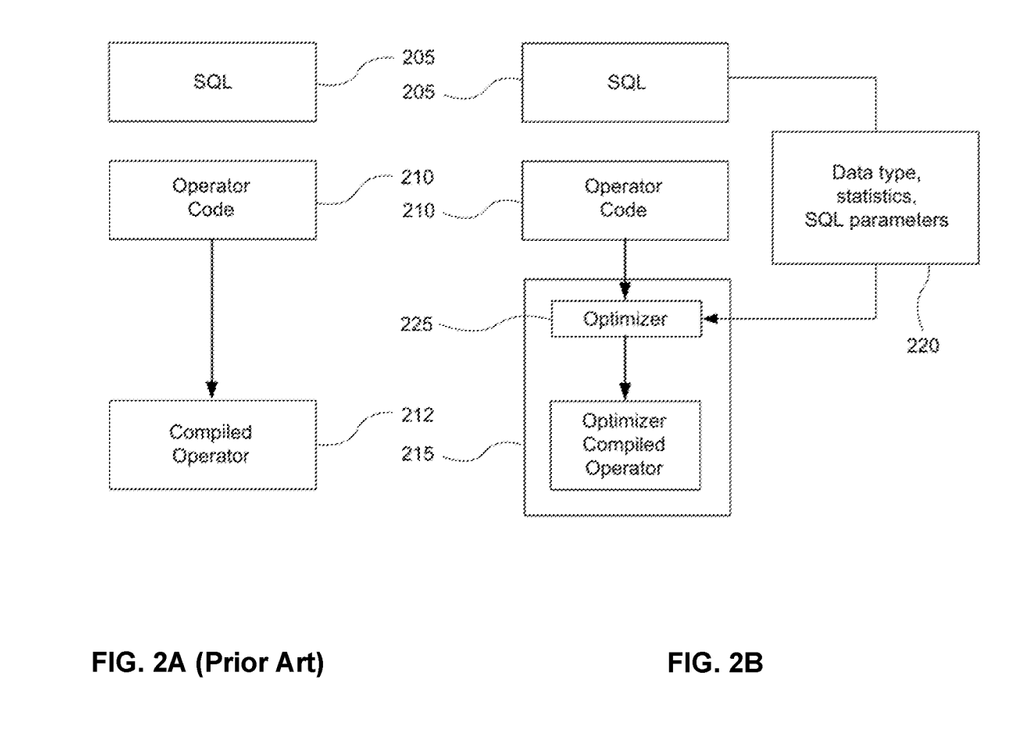
FIG. 2A is a block diagram illustrating the compilation of a high-level coded operator into a compiled operator, according to prior art.
FIG. 2B is a block diagram illustrating the compilation of a high-level coded operator into a compiled operator, according to an embodiment of the present disclosure.

FIG. 2A illustrates the compilation of a high-level coded operator into a compiled operator, according to existing solutions. A high-level (HL) language, such as SQL 205, can be used to create operator code 210 that is generic, such that a compiled operator 212 can be similar for any query. Neither the initial operator code 210, nor the compiled operator 212 is dependent on the search. Although FIG. 2A can represent a compilation of a single operator, in practice, a SQL query can generate a sequence of operators for performing retrieval, filtering, transformation, and perhaps other operations. For example, if a query is to identify from database employees whose ages are less than 25 years old, three operations and corresponding operators may be necessary: i. retrieving data from a database; ii. filtering the data by age; iii. filtering names from the output of the previous operation.

FIG. 2B illustrates the compilation of a high-level coded operator into a compiled operator, according to an embodiment of the present disclosure. The SQL language 205 or another high level (HL) code can be used to write an operator code 210. However, the embodiment involves optimizing an operator for a given input data query and therefore, before fully compiling the operator code 215, the information 220 including data type, statistics of data being queried, and SQL parameters can be received by an operator optimizer module 225, and be applied to the operator code 210 so as to optimize the operator for the input data query.

In an embodiment, an approach can be to leverage just-in-time compilation, such that an operator is optimized and compiled during query execution, in order to produce a result more quickly than if the operator was generic or not optimized. Optimization steps can include devising a query plan describing a flow of operations to be applied by operators to a data source, selecting algorithms for the operators, generating specialized operators, and optionally, a user can define how and when to apply the operators in the query plan (i.e. inject the operators). At this point, the database management system performing the query can execute the query plan using the injected optimized operators. Furthermore, to optimize an operator, an embodiment can leverage runtime information.

To select an operation algorithm, an embodiment can optimize a combination of operators, data structures, access patterns, and the parallelism of operations. To select a proper approach, an embodiment can take in account various inputs, including information from the data engine processing a data query, or from the data search, such as data types, statistical information, and SQL parameters. For example, in an operator algorithm, the use of certain data types can allow the selection of certain hash algorithms (i.e. probed operators). This can be more efficient than using classical filtering that requires reading of individual rows. Furthermore, an embodiment can use statistical information to select a level of parallelism and an operator fusion mechanism.

Figure 3:
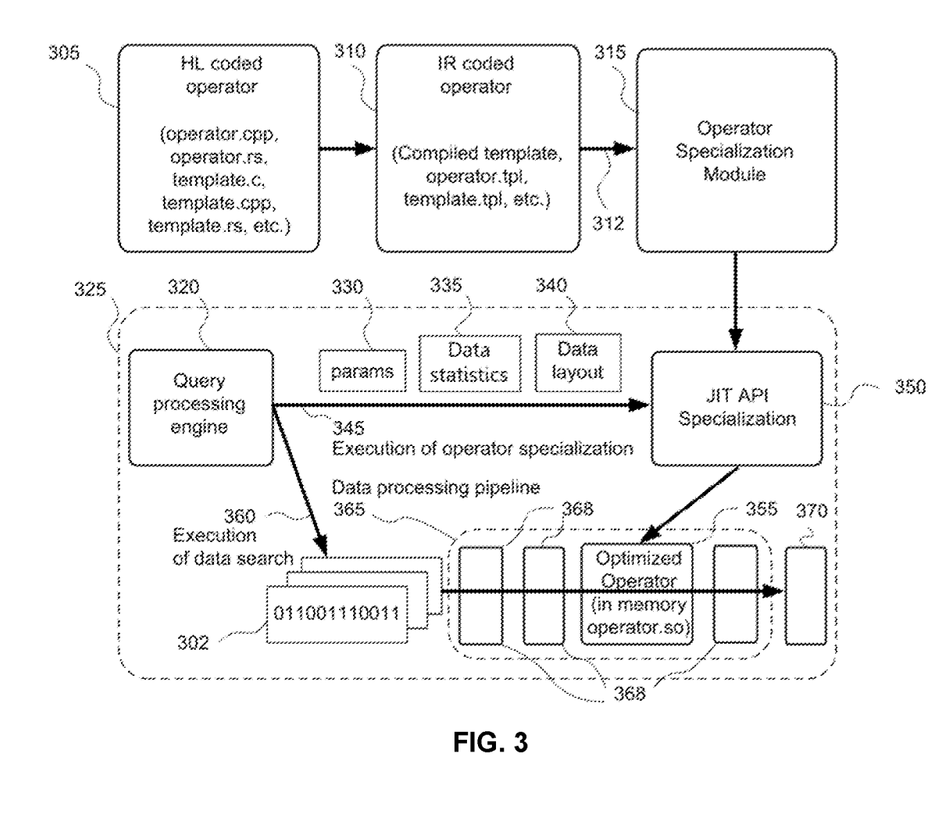
FIG. 3 is a block diagram illustrating a process by which an operator can be specialized for a query, according to an embodiment of the present disclosure.

FIG. 3 illustrates a process by which an operator can be specialized for a query, according to an embodiment of the present disclosure. At any time before a data search, an operator, for operating on data 302 in database, can be written in high-level (HL) code such as C, C++, Rust or another high-level code as a high-level coded operator 305. It can then be compiled into intermediate representation (IR) code in a template file referred to as a template or an operator.tpl file containing the IR coded operator 310, where the ".tpl" extension refers to a template file type. As IR code, the operator can be received 312 at an operator specialization module 315. When a query processing engine 320 executes a data search 360, it can also trigger the execution of an operator specialization 345, where the operator specialization module 315 can further take into consideration of metadata from the data search 360, and from the query processing engine 320 (e.g. a big data engine), which can be an SQL (structured query language) engine 320 processing 325 a data query. The metadata can include parameters of the query processing engine (i.e. "params", or system information) 330, data statistics 335 i.e. statistical information about the data or data search, and data layout 340 of the data or data search. The IR coded operator 310 in the optimizer specialization module 315 can then be optimized for the data engine 320 and data search 360, through an application programming interface (API) implementing just-in-time (JIT) compilation and optimization, thereby customizing (i.e. "specializing") the operator for the query. This can be referred to as JIT API specialization 350. The result can be a shared, in-memory operator file (i.e. operator.so), specialized for the query, which can be produced before the data search is completed, in order to improve the efficiency of the data search. The resulting operator.so file, which includes the optimized operator 355, can be placed in the data search pipeline 365 as a specialized operator among other operators 368, which can make the data processing pipeline execute faster than if the operator was not specialized. A data processing pipeline can include many operators 368 in sequence, as shown in FIG. 3, or in various other tree structures (not shown) allowing to produce a final result 370. An optimized operator file 355 can also be shared and used as needed with other similar queries executed in parallel or in the future, and as such, it can be referred to as "in-memory operator.so" file 355, where the ".so" extension refers to a shared object file type.

Figure 4:
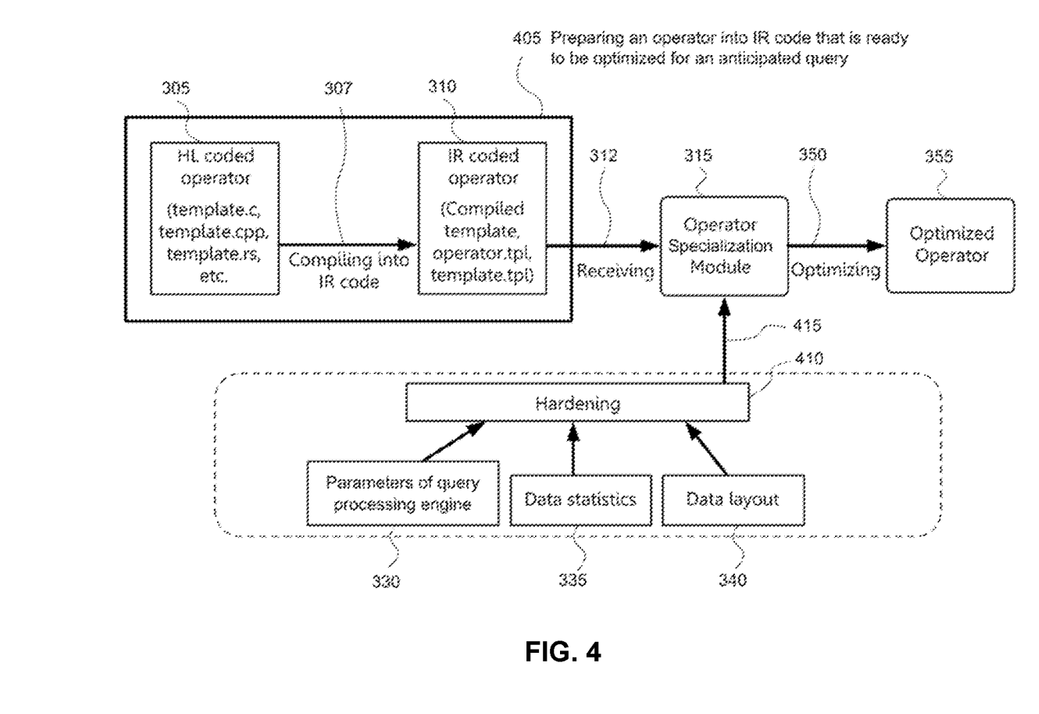
FIG. 4 is block diagram illustrating of a process by which an operator can be specialized for a query, according to an embodiment of the present disclosure.

FIG. 4 is another illustration of a process by which an operator can be specialized for a query, according to an embodiment of the present disclosure. Initially, an operator can be written in high-level (HL) code such as C++, Rust or another high-level code, and be referred to as an HL coded operator 305, or more specifically a "template.c" file, a "template.cpp" file or a "template.rs" file. It can then be compiled 307 into intermediate representation (IR) code in a file referred to as a compiled template, containing IR coded operator 310. These files are not created during a data search execution, but are rather prepared by a developer in anticipation of a data search, so as to be ready for further customization when a data search will be executed. In other words, a file containing an IR coded operator can be prepared at any time before a data search, and it is only when a data search will be executed that the IR coded operator of the file will be optimized and compiled for the data search execution. In some embodiments, the preparation 405 of an HL coded operator 305 into an IR coded operator 310 that is ready to be optimized for an anticipated queryso as to be utilized by an operator specialization module 315. Embodiments include the preparation 405 of an IR coded operator 310 which can be further optimized, in combination with an optimization 350 of the IR coded operator 310 for a data search. Embodiments can include an operator specialization module 315 for optimizing an IR coded operator 310. It should be appreciated that embodiments can be combined.

Once an IR coded operator 310 is prepared 405 to be optimized, it can be received 312 by (i.e. loaded in) an operator specialization module 315, which can optimize 350 the IR coded operator 310 into an operator that is optimized for a data query or data search using a given data engine, or in other words, an optimized operator 355.

In an embodiment, the optimization of an IR coded operator 310 can be performed in more than one step. One step can be to take into account metadata from the query and the query processing engine, i.e. the hardware involved in the search. This step can be referred to as "hardening" 410, which is essentially optimizing the operator for the hardware of the query processing engine. Hardening involves crystallizing, defining, or giving more accurate values to certain variables of the IR coded operator 310 those were previously unknown. The metadata can include parameters 330 of the data search and query processing hardware being used, statistical data 335 of the data search, and data layouts 340 of the data search.

If an IR code includes virtual function references to specific library functionalities, a compilation process can include the replacement of virtual function references with actual code from the library, and the hardening process can be applied after such replacement. The process of hardening 410 can be seen as an input 415 of metadata from a query, into an operator specialization module 315.

For implementing a data search according to embodiment in which an operator is especially adapted for the search itself, an embodiment can comprise two complementary work flows. One work flow can be performed during project build, at a time before a data search is executed and it can comprise the production of an operator template, created by a developer to be adaptable to certain data searches. A subsequent and complimentary method can be executed following a data search, but before its completion, and it can comprise optimizing an operator based on features of the data search itself. In another embodiment, this optimization based on a data search can be performed and completed within a short amount of time between the start of a data search execution, and the production of a result, such that the result is produced using the optimized operator.

Figure 5A:
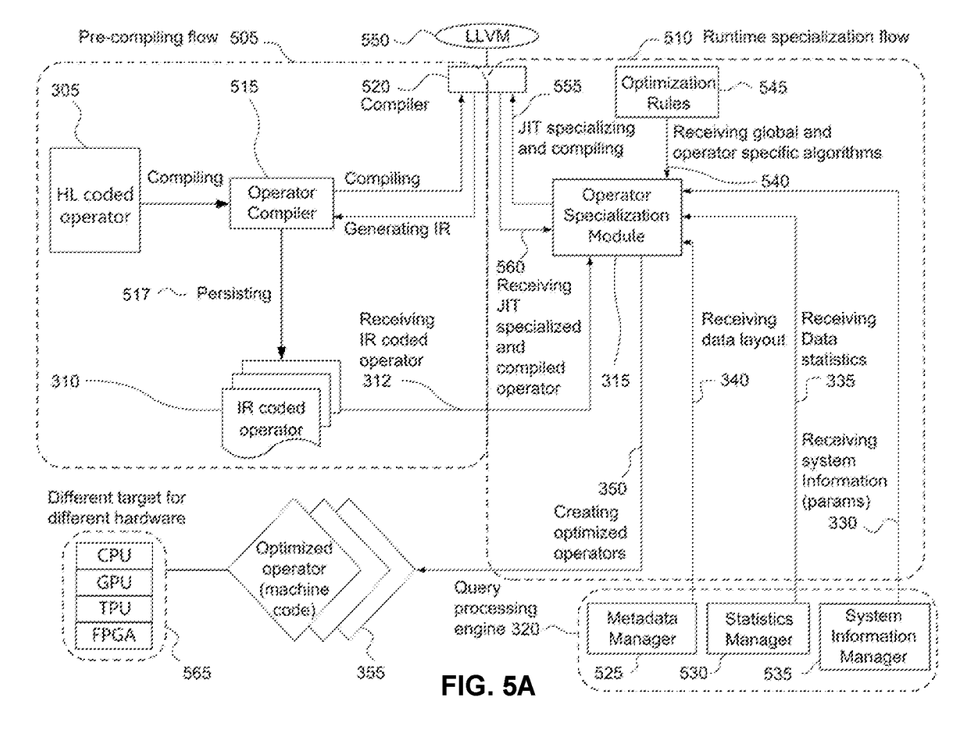
FIG. 5A is a block diagram illustrating a method for producing an optimized operator, according to an embodiment of the present disclosure.

FIG. 5A illustrates a method to produce an optimized operator, according to an embodiment. A method can been seen as two work flows: a pre-compile work flow 505 and a runtime specialization work flow 510. As an initial step, which can be performed at a time before the execution of a data search, a developer can create an operator in HL code such as C, C++, Rust or another HL code. The resulting file can be referred to as a HL coded operator 305. Using an operator compiler 515 (e.g. Clang or another), which can in turn make use of a global compiler 520, the HL coded operator 305 can be compiled into an IR coded operator 310. In an embodiment, an HL coded operator 305 can be written such that once compiled in an IR coded operator, it can be adaptable to a variety of anticipated data searches from a query processing engine 320. A copy of an IR coded operator 310 can be made to persist 517 in a pre-optimized state and can be saved to a file or maintained in a registry, such as to be available on demand for further use.

At runtime, when a data search is called for, another workflow can be performed and it can be identified as a runtime specialization flow 510. Upon execution of a data search, an operator specialization module 315 according to an embodiment can receive 312 an IR coded operator according to an embodiment. The operator specialization module 315 can also receive metadata from the data search itself, which can be used to specialize (i.e. customize or adapt) the IR coded operator 310. The metadata can be provided by a query processing engine 320 performing the data search. The query processing engine 320 can include a metadata manager 525, a statistics manager 530, and a system information manager 535, which can respectively provide data layouts 340, data statistics 335, and system information 330 to the operator specialization module 315 of an embodiment.

An operator specialization module 315 according to an embodiment can also receive 540 optimization rules 545, which can include global algorithms and also algorithms specific to certain operators.

In an embodiment, once an operator specialization module 315 has received 312 an IR coded operator 310, system information 330, data statistics 335, data layout 340 and optimization rules 545, the IR coded operator 310 can be compiled with a global compiler 520. In an embodiment, a global compiler 520 can be written using an infrastructure such as LLVM 550 or GCC, also an embodiment can alternatively make use of another compiling infrastructure instead. A compilation process can include applying optimizations to the IR coded operator 310, that are specific to the data received, and in particular, specific to the data provided by the search being requested by the query processing engine 320. Because it is being performed following a search request, it can be referred to as just-in-time (JIT) compiling and because its results can include an operator that is specialized for a particular search request, the compiler can be said to specialize the IR coded operation for the specific data search. For these reasons, the compiling at this step can be referred to as a step of JIT specializing and compiling 555 an IR coded operator 310.

In an embodiment, after an IR coded operator has been received 213 and just-in-time (JIT) specialized and compiled 555 by an operator specialization module 315, the resulting file can be received 560 again by the operator specialization module 315. The compilation 555 effectively corresponds to the creation of an optimized operator 355. The specialization and compilation 555 can convert the IR coded operator into an optimized operator that is compiled for the specific target hardware 565 of a query processing engine 320, such as for example a central processing unit (CPU), a graphics processing unit (GPU), a tensor processing unit (TPU), a field programmable gate array (FPGA) or other hardware. A runtime specialization flow 510 according to an embodiment as described can take an IR coded operator 310 as input, and produce an output an optimized operator 355, that is both specialized for a data search being executed by a query processing engine 320, and coded in the machine language of the target query processing engine 320 (i.e. compiled). Moreover, in embodiments, such production of an optimized operator according to an embodiment can take less time than a data search would take using an operator that is not optimized according to an embodiment.

Figure 5B:
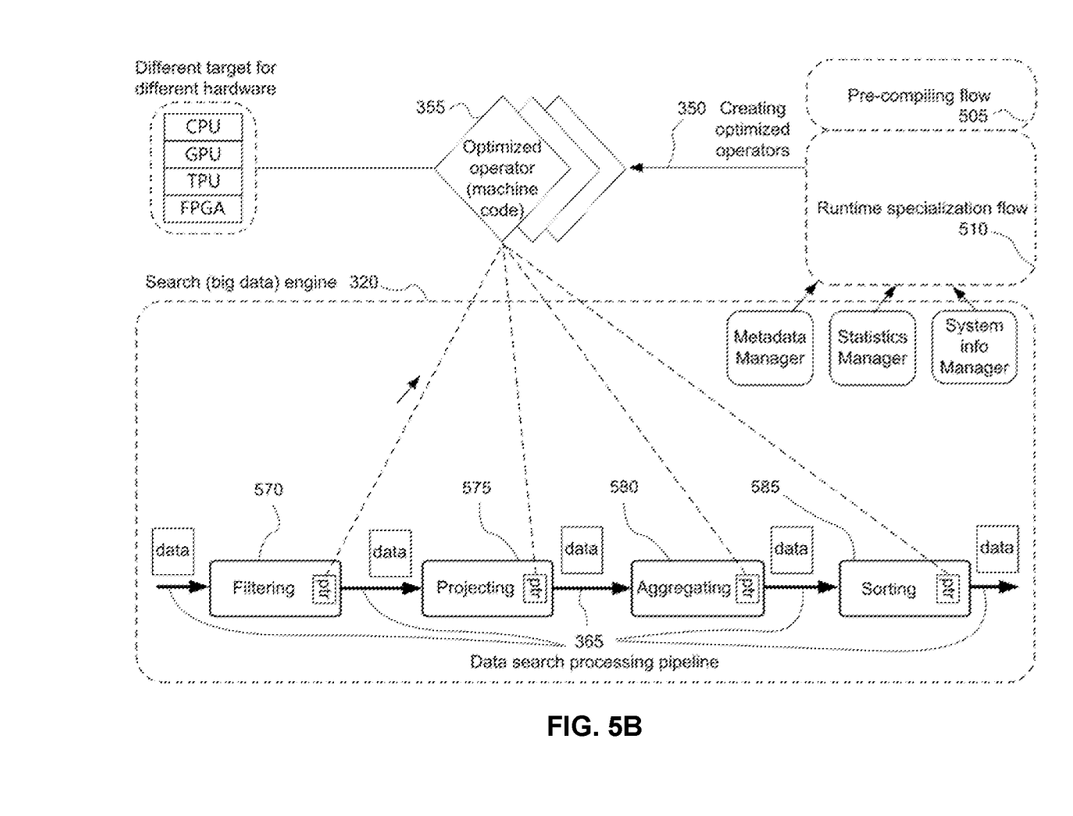
FIG. 5B is a block diagram illustrating data search processing pipeline and where an optimized operator can be used within, according to an embodiment of the present disclosure.

Once an optimized operator 355 has been produced within a pre-compile flow 505 and a runtime specialization flow 510 according to embodiments, it can be used as part of a pipeline 365 of operators by a query processing engine 320 to perform a data search.

FIG. 5B illustrates an optimized operator and where it can be used in a data search processing pipeline 365, which is shown in FIG. 3. Typical operations in a query processing engine data processing pipeline can include filtering 570, projecting 575 aggregating 580, sorting 585 and other operations, and these can be performed in various sequences or tree structures. In an embodiment, the sequence and the tree structure of any of these operations can be replaced or defined by an optimized operator 355 created 350 via a pre-compile flow 505 and a runtime specialization flow 510 according to an embodiment.

By having query operations, and therefore the query itself, optimized at a very low level (i.e. with IR or machine level coding), embodiments can enable a query execution to be adapted to the microarchitecture of a specific machine. A query that is compiled using such low-level code optimizations that also considers runtime data information, can be considered to be based on machine-level programming. Such queries can be classified in a taxonomy describing their results in terms of communication constraints, and other hardware-related constraints.

An embodiment can include certain specialized modules for performing certain steps of a runtime specialization flow 510. Further, a pre-compiling flow 505 and runtime specialization flow 510 can each process multiple operators at the same time, rather than just one as illustrated for simplicity in FIGS. 5A and 5B.

Figure 6:
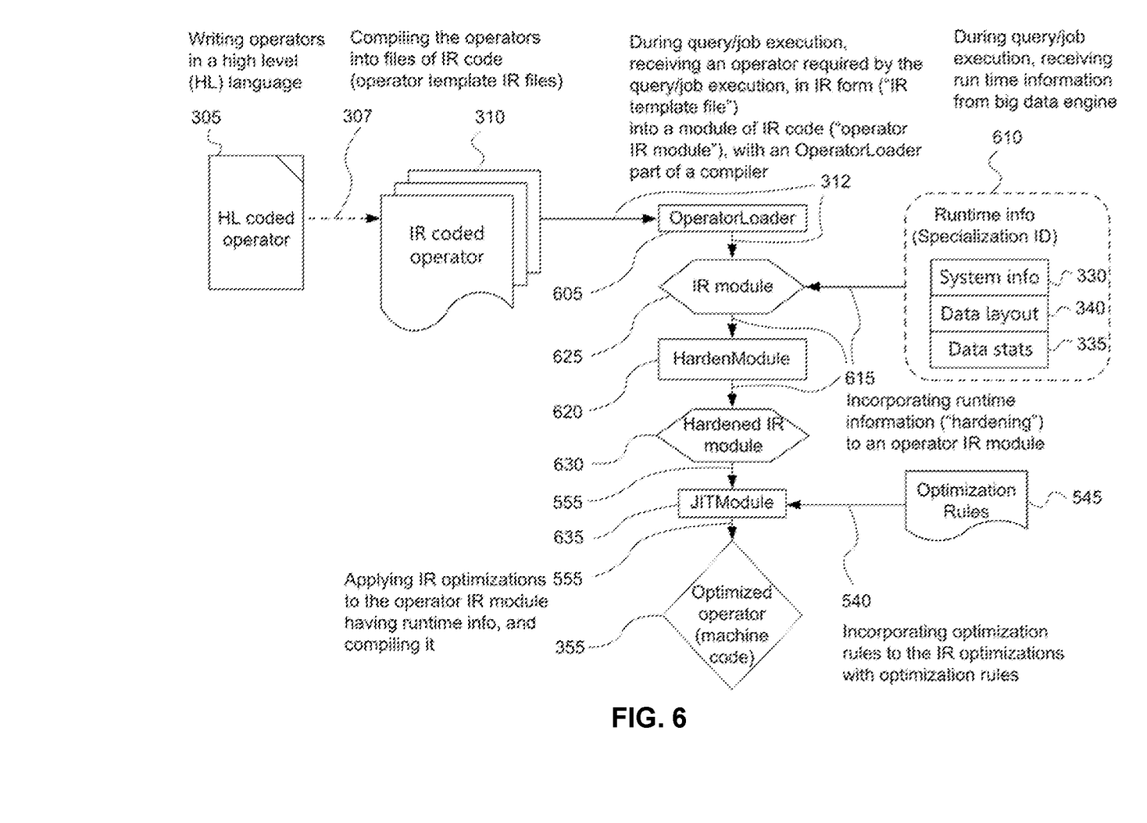
FIG. 6 is a block diagram illustrating a pre-compiling flow and runtime specialization flow for producing an optimized operator, in accordance with embodiments of the present disclosure.

FIG. 6 illustrates a pre-compiling flow 505 and a runtime specialization flow 510, in accordance with embodiments. To implement an embodiment, a developer can initially configure and write one or more operators in a high level programming language 305 such as C, C++, Rust or another programming language. Once written, a developer can use an operator compiler frontend 515 such as Clang (depending on which compiler infrastructure is used), to compile HL coded operators 305 into IR coded operators 310. Within an HL coded operator 305, a developer can specify which functions can be involved in specialization by an operator specialization module 315, by annotating them. If the compiler to be used is built with an LLVM infrastructure for example, the annotations can be Clang annotations. The annotations can tag the functions such that once compiled into an IR coded operator 310, the operator specialization module 315 can identify the annotated functions during the JIT specializing and compiling stage 555. The specialization process of those functions can be customized via programmatic means of mapping inputs and context information with specific optimization rules.

During a runtime specialization flow 510, an IR coded operator 310 called for by a query can be received 312 by an operator specialization module 315 using a loading module referred to as an "OperatorLoader" 605. In other words, during query/job execution, receiving an operator required by the query/job, in IR form ("IR template file") into a module of IR code, can be performed with an OperatorLoader part of a compiler. When a data query or data search is requested by a query processing engine 320, runtime information 610 can also be provided 615 to the operator specialization module 315. In other words, during query/job execution, the query processing engine can provide runtime information about at least one of data layouts, data statistics and system information. This can be received generally 540 by the operator specialization module 315, or more specifically, it can be received 610 by a specialized module referred to as HardenModule 620, as described further below. The runtime information 610 can include information describing the system hardware 330, information about the data layout 340 of the query, and statistical information about the data 335.

Parameters and variables of an operator specialization module 315 having received (i.e. loaded with) an IR coded operator 310 can be replaced with parameters and variables of the runtime information 610 by a process which can be referred to as hardening 615, and be performed by a module referred to as "HardenModule" 620. Because the operator specialization module 315 undergoes different stages, each stage can be identified differently such that when the operator specialization module 315 receives an IR coded operator 310 via a loading module 605, the operator specialization module can be referred to as an operator IR module, IR operator module or simply IR module 625, and after hardening 615 with a HardenModule 620, it can be referred to as a Hardened IR module 630. At this point, compilation 555 can be performed via a just-in-time compilation module JITModule 635. The JITModule 635 is a compiler to JIT compile a hardened operator IR module, and to apply optimizations enabled by rules to further optimize the code, remove dead code, remove unnecessary branches, to apply function inlining, etc. Because compilation should be performed after a data query is initiated, the process of applying optimizations and performing compilation can be referred to as a just-in-time (JIT) compiling. During compilation 555, optimizations to IR coded operators can take into account optimization rules 545, which can be applied 555 by JITModule 635 to the IR coded operators 310. The optimization rules 545 can include configuration and session values that are global, configuration and session values that are specific for one or many operators, and configuration and session values specific for the target hardware 565 of the query processing engine performing the data search. Operator code, resulting from optimizations and compilation 555, including optimized operators 355, can be configured with session and hardware values, globally or specifically for the operators.

The optimizations applied 555 to operators in IR code can include removing dead code, removing unnecessary branches, function inlining and other optimizations. The just-in-time compilation module 635 performing the optimizations on IR coded operators can be referred to as a JITModule 635. The output of a process, as represented in FIG. 6, is one or many optimized operators 355, as designed by a developer with HL code 305, optimized at the IR level according to optimization rules 545 and runtime information 610, and compiled 555 for the target hardware 565, i.e. one or many optimized operators 355 in target machine code, that can be used in a processing pipeline 365 of a data search performed by a query processing engine 320.

Figure 7:
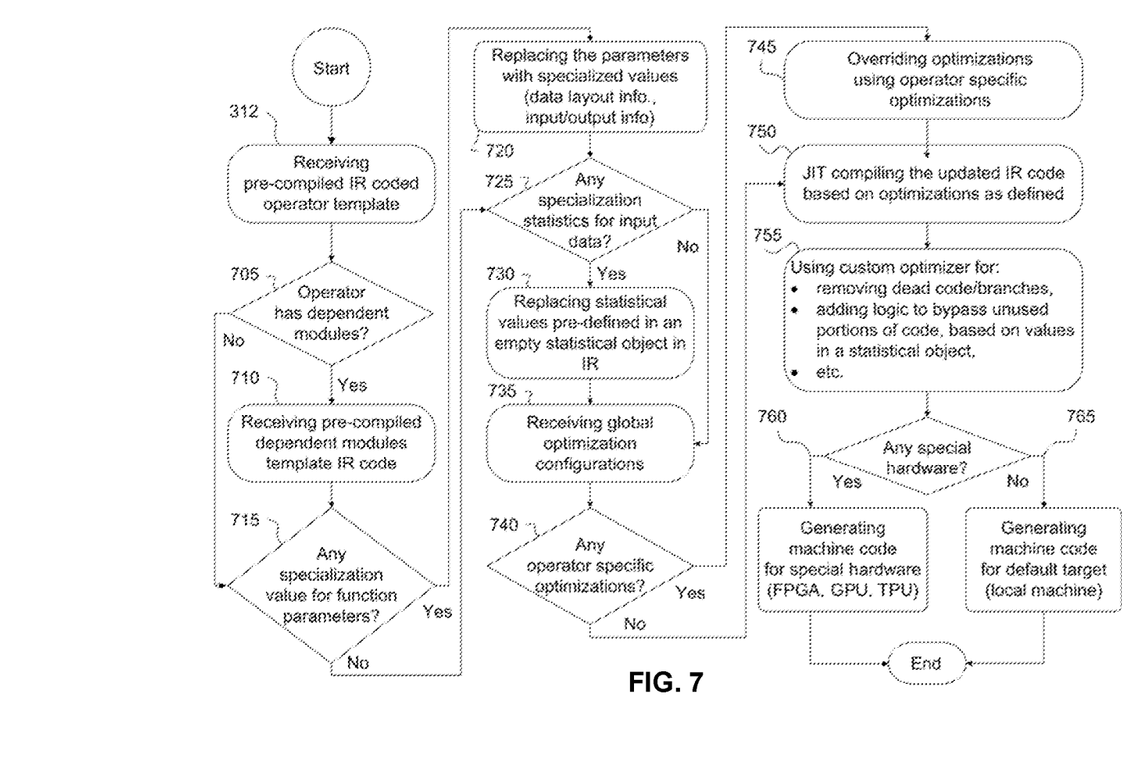
FIG. 7 is a flowchart illustrating a method may be involved in the preparation of operators to be used when a query is performed, according to an embodiment of the present disclosure.

FIG. 7 is a flowchart illustrating steps that may be involved in the preparation of operators to be used when a query is performed, according to an embodiment. Initially, an operator specialization module 315 can receive a pre-compiled IR coded operator template 312. If 705 a received IR coded operator 310 has dependent modules. A dependent module refers to a static function or library dependency that needs to be produced (i.e. emitted) along with the operator. The operator specialization module 315 can also receive 710 pre-compiled IR coded dependent modules. If 715 specialized values are available for function parameters in an operator, such as data layout information and input/output information, the operator specialization module can replace 720 them with the specialized values. If there are 725 specialization statistics 335 for the input data of the query (i.e. the data defining the query being processed), an operator specialization module can replace 730 statistical values pre-defined in an empty statistical object in an IR coded operator.

An operator specialization module 315 can also receive 735 global optimization configurations. If 740 there are operator specific optimizations, the operator specialization module can override 745 an optimization(s) with an operator specific optimization(s).

In an embodiment, an operator specialization module can be ready to JIT compile 750 and update an IR code based on optimizations as defined in previous steps. A compilation process can include, or be supplemented with, removing dead code, removing dead branches, adding logic to bypass (i.e. short circuit) unused portions of the code that would not be executed, based on information received such as that from a statistics object 755, and other optimizations. If 760 special hardware is involved in the query processing engine, such as a field programmable gate array (FPGA), a graphics processing unit (GPU) or a tensor processing unit (TPU), a compilation process can include or be supplemented with the generation 760 of machine code for the special hardware. Otherwise, it can generate 765 machine code for a default target such as a local machine can suffice.

Embodiments allow the expression of compiler optimizations that are available in presently existing query compilers, but also of compiler optimizations that are yet to be developed. More importantly, embodiments can provide a programmer with a large degree of flexibility, which is not found in query compilation of existing solutions.

Embodiments allow the integration and support of hardware-specific solutions, as well as flexible data processing capabilities without having to reengineer the overall compilation flow of a query.

Benefits of embodiments can include easy customization and maintainability of user defined optimizations. An embodiment can leverage runtime information 610 to further optimize a code 310, which can ultimately result in better use of hardware resource 565 and faster operation of a cluster of nodes comprising a big data system 320.

Embodiments include the use of user-generated operators 310 that when a data search is executed, are ready to perform as pre-generated operators that can be dynamically optimized during runtime. This can provide user-specific requirements and enable a degree of optimization, flexibility, and user-friendliness that are improved over that of generic operators of the prior art.

Embodiments include a monitoring system for collecting data from a query, job, and system, as well as metadata information from database data that can be consumed by a query optimizer, for enabling context-sensitive code generation and for optimizing a data processing pipeline.

Embodiments include a pre-optimizer algorithm that can select appropriate optimization methods and operators for a query, based on the runtime information collected by a monitoring system.

Embodiments include secondary level optimization for hardware-specific context, in order to allow an integration of hardware-specific optimization techniques that cannot be enabled via normal means without manual tuning. For example, if any of a CPU, a GPU, a TPU or an FPGA platform is available, ready to be used, and based on the data to be consumed, an optimizer can leverage them.

Embodiments include a combination of described methods and systems through a just-in-time compiler operative to generate and execute optimized machine code for a selected target.

Embodiments can store an optimized code, including optimized operators according to embodiment, in a cache for possible subsequent reuse.

Figure 8:
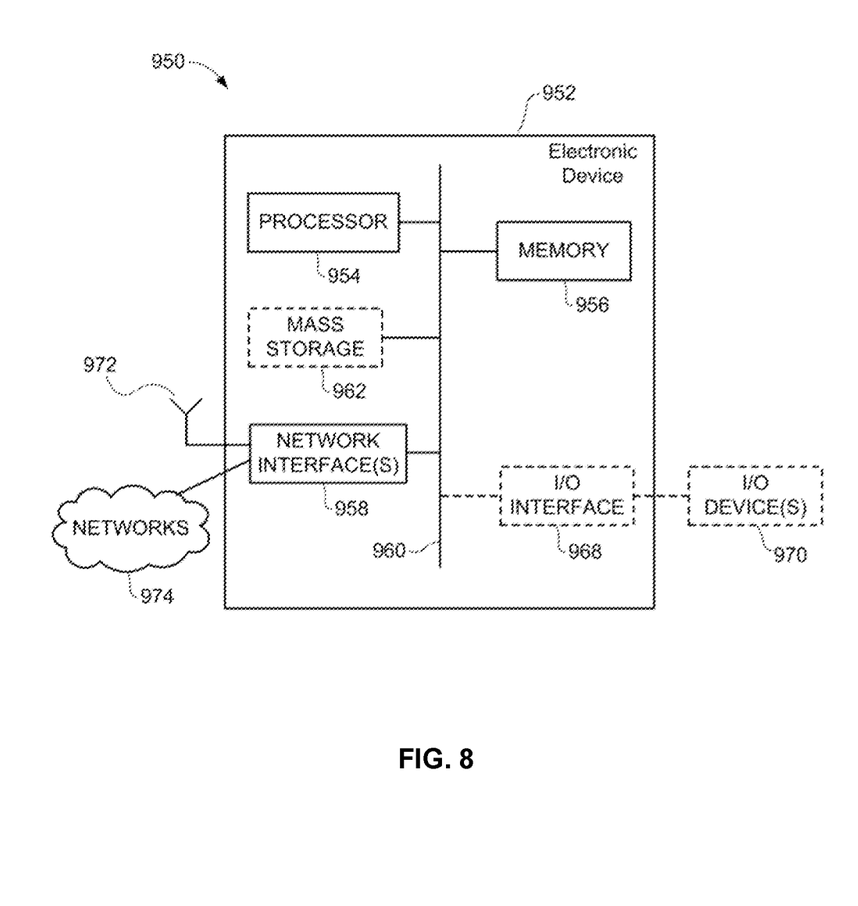
FIG. 8 is a block diagram of an electronic device within a computing and communications environment that may be used for implementing devices and methods in accordance with representative embodiments of the present disclosure.

FIG. 8 is a block diagram of an electronic device (ED) 952 illustrated within a computing and communications environment 950 that may be used for implementing the devices and methods disclosed herein. The electronic device 952 typically includes a processor 954, such as a central processing unit (CPU), and may further include specialized processors such as a graphics processing unit (GPU), a tensor processing unit (TPU), a field programmable gate array (FPGA) or other such processor, a memory 956, a network interface 958 and a bus 960 to connect the components of ED 952. ED 952 may optionally also include components such as a mass storage device 962, a video adapter 964, and an I/O interface 968 (shown in dashed lines). An ED 952 according to an embodiment can also include a cache.

The memory 956 may comprise any type of non-transitory system memory, readable by the processor 954, such as static random-access memory (SRAM), dynamic random-access memory (DRAM), synchronous DRAM (SDRAM), read-only memory (ROM), or a combination thereof. In an embodiment, the memory 956 may include more than one type of memory, such as ROM for use at boot-up, and DRAM for program and data storage for use while executing programs. The bus 960 may be one or more of any type of several bus architectures including a memory bus or memory controller, a peripheral bus, or a video bus.

The electronic device 952 may also include one or more network interfaces 958, which may include at least one of a wired network interface and a wireless network interface. As illustrated in FIG. 7, network interface 958 may include a wired network interface to connect to a network 974, and also may include a radio access network interface 972 for connecting to other devices over a radio link. The network interfaces 958 allow the electronic device 952 to communicate with remote entities such as those connected to network 974.

The mass storage 962 may comprise any type of non-transitory storage device configured to store data, programs, and other information and to make the data, programs, and other information accessible via the bus 960. The mass storage 962 may comprise, for example, one or more of a solid-state drive, hard disk drive, a magnetic disk drive, or an optical disk drive. In some embodiments, mass storage 962 may be remote to the electronic device 952 and accessible through use of a network interface such as interface 958. In the illustrated embodiment, mass storage 962 is distinct from memory 956 where it is included and may generally perform storage tasks compatible with higher latency, but may generally provide lesser or no volatility. In some embodiments, mass storage 962 may be integrated with a heterogeneous memory 956.

In some embodiments, electronic device 952 may be a standalone device, while in other embodiments electronic device 952 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

In embodiments, an electronic device 952 can be used for compiling HL and IR code, for applying optimizations to IR code, for storing data, and for processing a data query though a pipeline of operators and/or optimized operators according to embodiments.

Examples of the present disclosure include a method of performing a data search, the method comprising: obtaining at least one operator; obtaining runtime information of the data search; obtaining optimization rules; obtaining at least one optimized and compiled operator by optimizing and compiling the at least one operator according to the runtime information of the data search and the optimization rules; and performing the data search using the at least one optimized and compiled operator.

In the above example, an operator can be configured in a high level programming language, and compiled by a front-end compiler into an intermediate representation code of the at least one operator.

In any of the above examples, an operator can include annotations tagging functions which are to be specialized when the at least one operator is being optimized and compiled for the data search at runtime.

In any of the above examples, the runtime information can include includes data layout.

In any of the above examples, the runtime information can include data statistics.

In any of the above examples, the runtime information can include hardware information of the query processing engine.

In any of the above examples, the optimization rules can include global algorithms.

In any of the above examples, the optimization rules can be based on the runtime information.

In any of the above examples the optimization rules can include algorithms specific to the at least one operator.

In any of the above examples, optimizing an operator can include an application of at least one optimization to the code of an operator that increases the efficiency of a data search executing that operator.

In any of the above examples, optimizing an operator can be performed after a data search is called for, and before the data search is complete, such that performing the data search includes executing at least one optimized operator.

In any of the above examples, performing a data search can include optimizing and compiling many operators, which can subsequently be executed by the data search according to a query plan defined by the optimization and compilation.

Some examples of the present disclosure include a system for performing a data search comprising: at least one processor, storage medium for data, storage medium for a query processing engine, storage medium for a compiler, and storage medium for at least one operator file configured with a programming language; wherein upon executing the query processing engine, the compiler is operative to obtain at least one optimized and compiled operator file by optimizing and compiling the at least one operator file according to the runtime information of the data search, and according to optimization rules; and wherein performing the data search includes executing the at least one optimized and compiled operator file.

In the above example, prior to being optimized and executed by the query processing engine, the at least one operator file can be configured with a high level programming language and be compiled into intermediate representation code.

In any of the above examples, a system can further include an operator specialization module that is operative to receive at least one operator file, as well as the runtime information from the query processing engine; and to have at least one operator file optimized and compiled based on runtime information.

In any of the above examples, an operator file can be configured with a high level programming language and be compiled into an intermediate representation code.

In any of the above examples, an operator file can include annotations tagging functions that are to be specialized when the operator coded within the operator file is being optimized and compiled for the data search at runtime.

In any of the above examples, the runtime information can include data layout.

In any of the above examples, the runtime information can include data statistics.

In any of the above examples, the runtime information can include hardware information.

A computer program can include instructions which can, when the program is executed by a computer, cause the computer to carry out the method of any one of claims 1 to 12.

A computer-readable medium can include instructions which can, when executed by a computer, cause the computer to carry out the method of any one of claims 1 to 12.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A computerized method of performing, by a query processing engine, a data search in a database:
    obtaining, by an operator specialization module of the query processing engine, intermediate representation code of at least one operator, the intermediate representation code configured in a high-level programming language and compiled by a front-end compiler;
    optimizing, by the operator specialization module and during runtime of performing the data search, the intermediate representation code based on runtime information of the runtime of performing the data search, to generate at least one optimized and compiled operator, the information of the runtime of performing the data search comprising statistical information about the data search of the data related thereto, the optimizing the intermediate representation code comprising:
        specializing, based on the information of the runtime of performing the data search, the intermediate representation code for adapting to the data search and the hardware of the query processing engine,
        selecting a level of parallelism and an operator fusion mechanism using the statistical information, and
        optimizing the specialized intermediate representation code based on the information of the runtime of performing the data search to generate at least one optimized and compiled operator,
    compiling the optimized intermediate representation code to generate at least one optimized and compiled operator; and
    performing the data search by the query processing engine using the at least one optimized and compiled operator.

2. The method of claim 1, wherein the at least one operator comprises annotations tagging functions that are to be specialized when the at least one operator is being optimized and compiled for the data search at the runtime of performing the data search.

3. The method of claim 1, wherein the runtime information of the runtime of performing the data search further comprises:
    data layout of the data search or data related thereto,
    statistical information about the data search or data related thereto, or
    a combination thereof.

4. The method of claim 1, wherein the optimization rules include global algorithms.

5. The method of claim 1, wherein the optimization rules are based on the runtime information of the runtime of performing the data search.

6. The method of claim 1, wherein the optimization rules include algorithms specific to the at least one operator.

7. The method of claim 1, wherein optimizing the at least one operator comprises an application of at least one optimization to a code of the at least one operator that increases the efficiency of a data search executing the at least one operator.

8. The method of claim 1, wherein the performing the data search comprises generating optimized and compiled operators via the optimizing and compiling, which are subsequently executed by the data search according to a query plan defined by the data search.

9. A system for performing, by a query processing engine of specific hardware, a data search in a database comprising:
    a memory storing instructions; and
    at least one processor in communication with the memory, the at least one processor configured, upon execution of the instructions, to perform the following steps:
        obtaining intermediate representation code of at least one operator, the intermediate representation code configured in a high-level programming language and compiled by a front-end compiler;
        optimizing the intermediate representation code, based on information of the runtime of performing the data search;
        compiling the optimized intermediate representation code to generate at least one optimized and compiled operator, and
        performing the data search by the query processing engine using the at least one optimized and compiled operator,
    wherein the information of the runtime of performing the data search comprises statistical information about the data search or the data related thereto; and
    wherein the optimizing the intermediate representation code comprises:
        specializing, based on the information of the runtime of performing the data search, the intermediate representation code for adapting to the data search and the hardware of the query processing engine,
        selecting a level of parallelism and an operator fusion mechanism using the statistical information, and
        optimizing the specialized intermediate representation code, based on the information of the runtime of performing the data search, to generate at least one optimized and compiled operator.

10. The system of claim 9, further comprising an operator specialization module that is operative to receive at least one operator file, as well as the runtime information from the query processing engine; and to have the at least one operator file optimized and compiled based on the runtime information of the data search.

11. The system of claim 9, wherein the at least one operator comprises annotations tagging functions that are to be specialized when the at least one operator is being optimized and compiled for the data search at the runtime of performing the data search.

12. The system of claim 9, wherein the information of the runtime of performing the data search further comprises:
    data layout of the data search or data related thereto,
    statistical information about the data search or data related thereto, or
    a combination thereof.

13. The system of claim 9, wherein the optimization rules include global algorithms.

14. The system of claim 9, wherein the optimization rules are based on the runtime information of the runtime of performing the data search.

15. The system of claim 9, wherein the optimization rules include algorithms specific to the at least one operator.

16. The system of claim 9, wherein the performing the data search comprises generating optimized and compiled operators via the optimizing and compiling, which are subsequently executed by the data search according to a query plan defined by the data search.

17. A non-transitory computer-readable media storing comprising computer instructions that configure at least one processor, upon execution of the instructions, to perform the following steps:
    obtain intermediate representation code of at least one operator, the intermediate representation code configured in a high-level programming language and compiled by a front-end compiler;
    optimized the intermediate representation code, based on information of the runtime of performing the data search;
    compile the optimized intermediate representation code to generate at least one optimized and compiled operator; and
    perform the data search by the query pr si engine using the at least one optimized and compiled operator;
    wherein the information of the runtime of performing the data search comprises statistical information about the data search or the data related thereto; and
    wherein the optimizing specializing, based on the information of the runtime of performing the data search the intermediate representation code for adapting to the data search and the hardware of the query processing engine,
        selecting a level of parallelism and an operator fusion mechanism using the statistical information, and
        optimizing the specialized intermediate representation code, based on the information of the runtime of performing the data search, to generate at least one optimized and compiled operator.

18. The method of claim 1, wherein the optimizing and compiling comprise:
    obtaining the runtime information of the runtime of performing the data search;
    obtaining optimization rules; and
    one or a combination of operations selected from removing dead code in the intermediate representation code, removing dead branches in the representation code, and adding logic in the intermediate representation code to bypass unused portions of code based on the runtime information of the runtime of performing the data search and the optimization rules.

19. The non-transitory computer-readable media of claim 17, wherein the specializing the intermediate representation code comprises:
    specializing, based on the runtime information of the runtime of performing the data search, the intermediate representation code by:
        optimizing the at least one operator for the hardware of the query processing engine, and
        defining or giving values to variables of the intermediate representation code that were previously unknown.

20. The non-transitory computer-readable media of claim 17, wherein the at least one operator comprises annotations tagging functions that are to be specialized when the at least one operator is being optimized and compiled for the data search at the runtime of performing the data search.

21. The non-transitory computer-media of claim 17, wherein the runtime information of the runtime of performing the data search further comprises:
    data layout of the data search or data related thereto,
    statistical information about the data search or data related thereto, or
    a combination thereof.

22. The non-transitory computer-readable media of claim 17, wherein the optimization rules include global algorithms.

23. The non-transitory computer-readable media of claim 17, wherein the optimization rules are based on the runtime information of the runtime of performing the data search.

24. The non-transitory computer-readable media of claim 17, wherein the optimization rules include algorithms specific to the at least one operator.

25. The non-transitory computer-readable media of claim 17, wherein optimizing the at least one operator comprises an application of at least one optimization to a code of the at least one operator that increases the efficiency of a data search executing the at least one operator.

26. The non-transitory computer-readable media of claim 17, wherein performing a data search comprises the optimizing and compiling many operators, which are subsequently executed by the data search according to a query plan defined by the data search.

* * * * *